United States Patent
Neff et al.

(10) Patent No.: US 6,829,537 B2
(45) Date of Patent: Dec. 7, 2004

(54) CONTOUR-BASED ATTRIBUTE SEISMIC MAPPING

(75) Inventors: Dennis B. Neff, Grove, OK (US); Scott A. Runnestrand, Katy, TX (US); Franklin D. Lane, Fulshear, TX (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 10/385,134

(22) Filed: Mar. 10, 2003

(65) Prior Publication Data

US 2004/0181341 A1 Sep. 16, 2004

(51) Int. Cl.[7] .................................................. G01V 1/28
(52) U.S. Cl. ........................................... 702/5; 702/16
(58) Field of Search .............................. 702/5, 16, 17; 367/43, 45, 73

(56) References Cited

U.S. PATENT DOCUMENTS

| | | | |
|---|---|---|---|
| 5,226,019 A | | 7/1993 | Bahorich |
| 5,355,313 A | * | 10/1994 | Moll et al. ..................... 702/2 |
| 5,828,570 A | * | 10/1998 | Gaiser ......................... 702/17 |
| 6,012,018 A | | 1/2000 | Hornbuckle |
| 6,014,343 A | * | 1/2000 | Graf et al. ..................... 367/38 |
| 6,028,820 A | | 2/2000 | Pisetski |
| 6,055,214 A | * | 4/2000 | Wilk ............................ 367/99 |
| 6,092,025 A | | 7/2000 | Neff |
| 6,446,008 B1 | * | 9/2002 | Ozbek ......................... 702/17 |
| 6,664,788 B2 | * | 12/2003 | Hornbostel et al. ......... 324/323 |

OTHER PUBLICATIONS

Hocker, Christian and Fehmers, Gijs. "Fast structural interpretation with structure–oriented filtering." *The Leading Edge* Mar. 2002: 238–243.

\* cited by examiner

*Primary Examiner*—Donald McElheny, Jr.
(74) *Attorney, Agent, or Firm*—Kameron D. Kelly; Ryan N. Cross

(57) ABSTRACT

A system for filtering elevation-sensitive data. The system generates coincident contour and attribute maps of a physical structure. A filter band that is limited to a certain range of contour values is used to filter the attribute values that are output to a CBA attribute map. The filter band applied to the data is defined between upper and lower boundaries, with each boundary having a substantially constant contour value. Thus, each data point has a uniquely-shaped a real filter that is at least partly defined by the filter band.

34 Claims, 8 Drawing Sheets

(5 of 8 Drawing Sheet(s) Filed in Color)

CONTOUR-BASED ATTRIBUTE SEISMIC MAPPING

BACKGROUND OF THE INVENTION

1. Field of the Invention

The present invention relates generally to the field of electronic data filtering. In another aspect the invention concerns a system for filtering contour-sensitive seismic data.

2. Discussion of Prior Art

The detection of hydrocarbon contacts, zones of diagenetic cementation, and anomalous pressure are common problems in oil and gas exploration and production. Seismic data can often yield insights as to where these geologic features occur in time or depth. However, one problem with using seismic data to detect hydrocarbon contact, zones of diagenetic cementation, and anomalous pressure is that often seismic attributes, such as amplitude, interval velocity, and AVO class, are localized and highly variable due to lateral lithology changes and seismic noise.

Typically seismic attribute maps are presented as 2-D flat images or may be draped on the structural surface along which they were extracted. Typically, the filtering of data used to generate seismic attribute maps is done for a user specified area, without regard for time or depth. Such filtering without regard for time or depth can cause smearing of elevation-sensitive (i.e., contour-sensitive) data across structural (contour) boundaries.

OBJECTS AND SUMMARY OF THE INVENTION

It is, therefore, and object of the present invention to provide a data filtering system for contour-sensitive data that minimizes data smearing along structural (contour) boundaries.

Other objects and advantages of the present invention will be apparent from the following detailed description of the preferred embodiments, claims, and drawing figures.

In accordance with one embodiment of the present invention, there is provided a method of filtering contour-sensitive attribute data comprising the steps of: (a) generating a contour map of a physical structure; (b) generating an attribute map of the physical structure, with the attribute map being substantially coincident with the contour map; (c) defining a contour filter band that is limited to a certain range of contour values; and (d) filtering the attribute map using only attribute values that are located within the contour filter band.

In accordance with a further embodiment of the present invention, there is provided a method of filtering contour-sensitive seismic data comprising the steps of: (a) generating a contour map of a subterranean structure; (b) generating a seismic attribute map of the subterranean structure, with the attribute map being defined by a plurality of attribute data points that are substantially coincident with the contour map; (c) selecting a reference point from the attribute data points; (d) defining a filter zone around the reference point; (e) defining a contour filter band within the filter zone, with the contour filter band being limited to a certain range of contour values; and (f) calculating a filtered attribute value for the reference point based on the values of all attribute data points located within the contour filter band.

In accordance with another embodiment of the present invention, there is provided a computer-implemented method of filtering contour-sensitive seismic data comprising the steps of: (a) generating a topographical map of a subterranean structure, with the map being defined by a plurality of seismic data points each having a unique position relative to orthogonal X, Y, and Z coordinate axes, the X and Y axes having units of distance, the Z axis having units of contour value; (b) assigning a seismic attribute value to each seismic data point; (c) selecting a reference point from the seismic data points; (d) defining a filter zone around the reference point, with the filter zone being defined along the X and Y axes; (e) defining a contour filter band for the seismic data points located within the filter zone, with the contour filter band being defined along the Z axis; and (f) calculating a filtered attribute value for the reference point based on all seismic data points located within the contour filter band.

In still another embodiment of the present invention, there is provided a program storage device readable by a computer. The device tangibly embodies a program of instructions executable by the computer for filtering contour-sensitive seismic data. The program of instructions comprises the steps of: (a) generating a contour map of a subterranean structure; (b) generating a seismic attribute map of the subterranean structure, with the attribute map being defined by a plurality of attribute data points that are substantially coincident with the contour map; (c) selecting a reference point from the attribute data points; (d) defining a filter zone around the reference point; (e) defining a contour filter band within the filter zone, with the contour filter band being limited to a certain range of contour values; and (f) calculating a filtered attribute value for the reference point based on the values of all attribute data points located within the contour filter band.

In yet another embodiment of the present invention, there is provided an apparatus for filtering contour-sensitive seismic data. The apparatus comprises a computer programmed to carry out the following method steps: (a) generating a contour map of a subterranean structure; (b) generating a seismic attribute map of the subterranean structure, with the attribute map being defined by a plurality of attribute data points that are substantially coincident with the contour map; (c) selecting a reference point from the attribute data points; (d) defining a filter zone around the reference point; (e) defining a contour filter band within the filter zone, with the contour filter band being limited to a certain range of contour values; and (f) calculating a filtered attribute value for the reference point based on the values of all attribute data points located within the contour filter band.

BRIEF DESCRIPTION OF THE DRAWING FIGURES

The patent or application file contains at least one drawing executed in color. Copies of this patent or patent application publication with color drawing(s) will be provided by the U.S. Patent and Trademark Office upon request and payment of the necessary fees.

The preferred embodiment of the invention is described in detail below with reference to the attached drawing figures, wherein:

FIG. 9b is a computer generated amplitude map corresponding to the contour map shown in FIG. 9a;

FIG. 10b is a computer generated amplitude map corresponding to the contour map shown in FIG. 10a;

DETAILED DESCRIPTION OF THE PREFERRED EMBODIMENT

Figure 1:
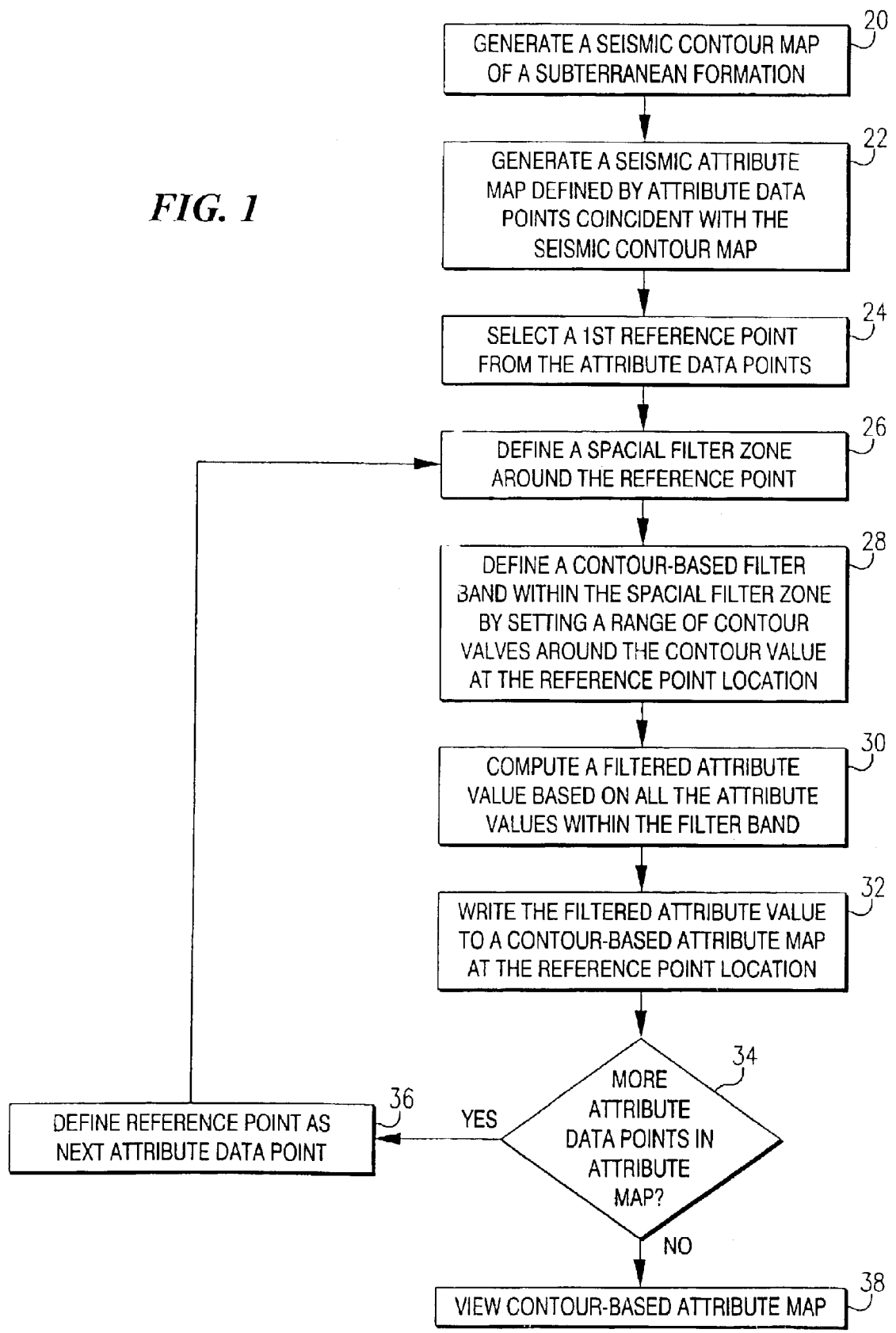
FIG. 1 is a computer flow chart outlining the inventive steps for filtering contour-sensitive seismic attribute data using coincident seismic contour and attribute maps.
Figure 2:
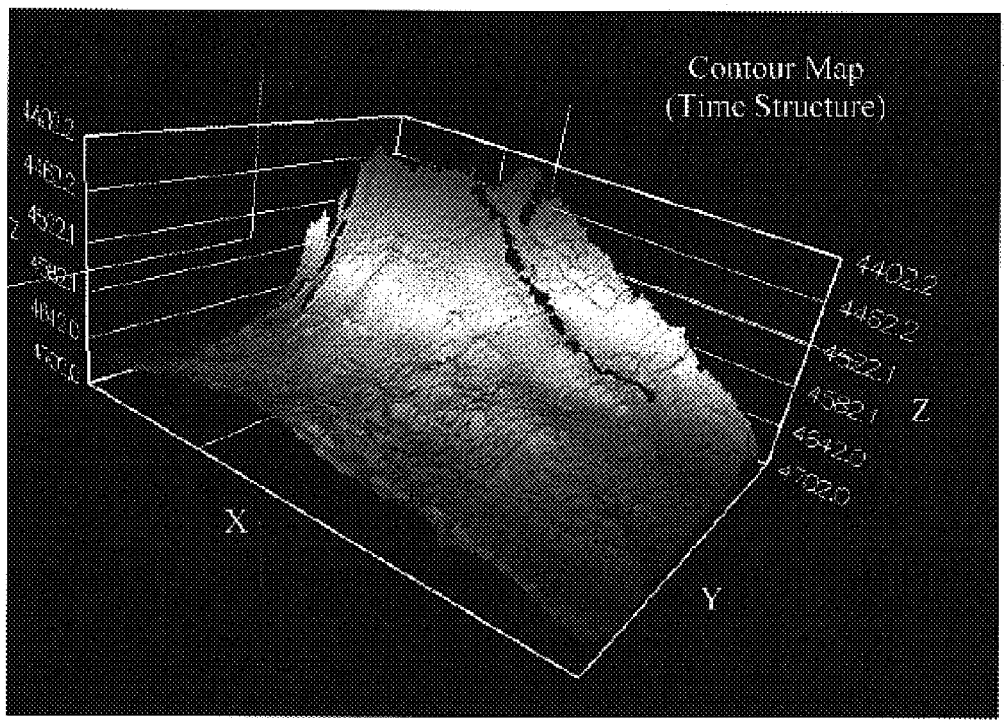
FIG. 2 is a computer generated contour map showing the time structure of a subterranean formation with the X and Y axes being in units of distance and the Z axis being in units of time.

Referring initially to FIG. 1, in step 20, a seismic contour map of a subterranean formation is generated in accordance with standard practice. Generation of the contour map can be performed manually, but it is preferred for step 20 to be a computer implemented process. Referring to FIG. 2, a computer generated time structure contour map is illustrated in relation to orthogonal X, Y, and Z coordinate axes. The X and Y axes of the contour map in FIG. 2 represent units of distance, while the Z axis represents units of time. Although FIG. 2 illustrates a time structure contour map, it should be understood that the contour map generated in step 20 (FIG. 1) can be selected from a variety of contour maps having X and Y axis units of distance and varying units for the Z axis. Examples of suitable contour maps that can be generated in step 20 of the present invention include time structure maps, depth structure maps, isochron maps, and isopach maps.

Figure 3:
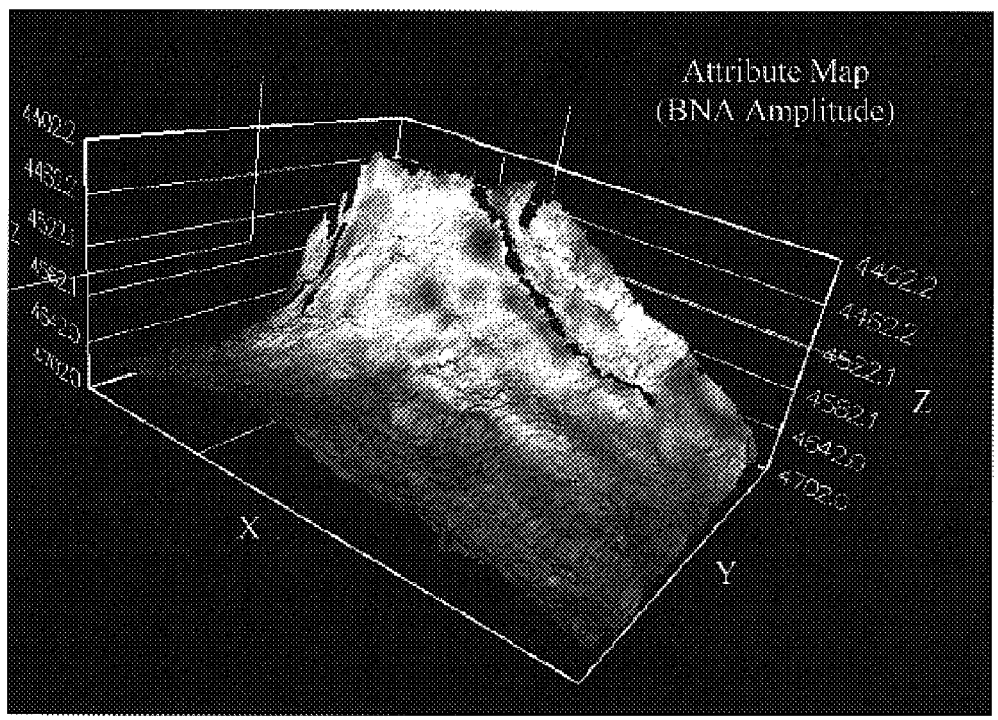
FIG. 3 is a computer generated attribute map that is coincident with (i.e., draped onto) the contour map shown in FIG. 2, particularly illustrating the BNA amplitude of the subterranean structure defined along the contour map.

Referring again to FIG. 1, in step 22, a seismic attribute map coincident with the seismic contour map is generated in accordance with standard practice. FIG. 3 shows a Background Normalized Amplitude (BNA) seismic attribute map that is essentially BNA amplitude values draped onto the time structure contour map illustrated in FIG. 2. Thus, the attribute map illustrated in FIG. 3 and the contour map illustrated in FIG. 2. are substantially coincident with one another. Each data point defining the attribute map in FIG. 3 has a unique contour value based on its position relative to the Z axis.

Figure 5:
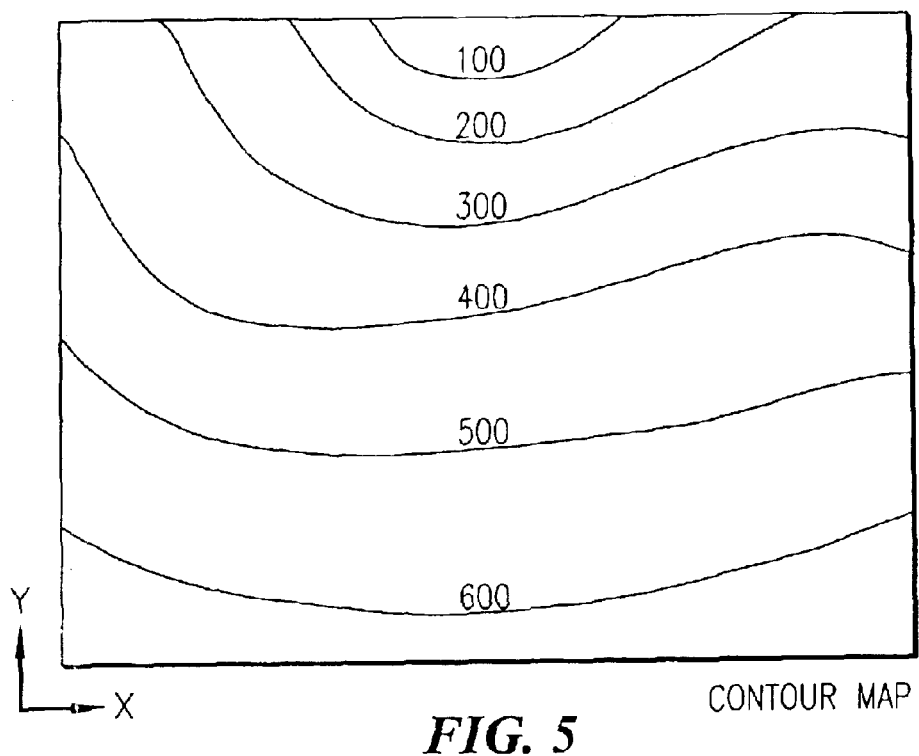
FIG. 5 is a simplified two-dimensional illustration showing a contour map of a physical structure.
Figure 6:
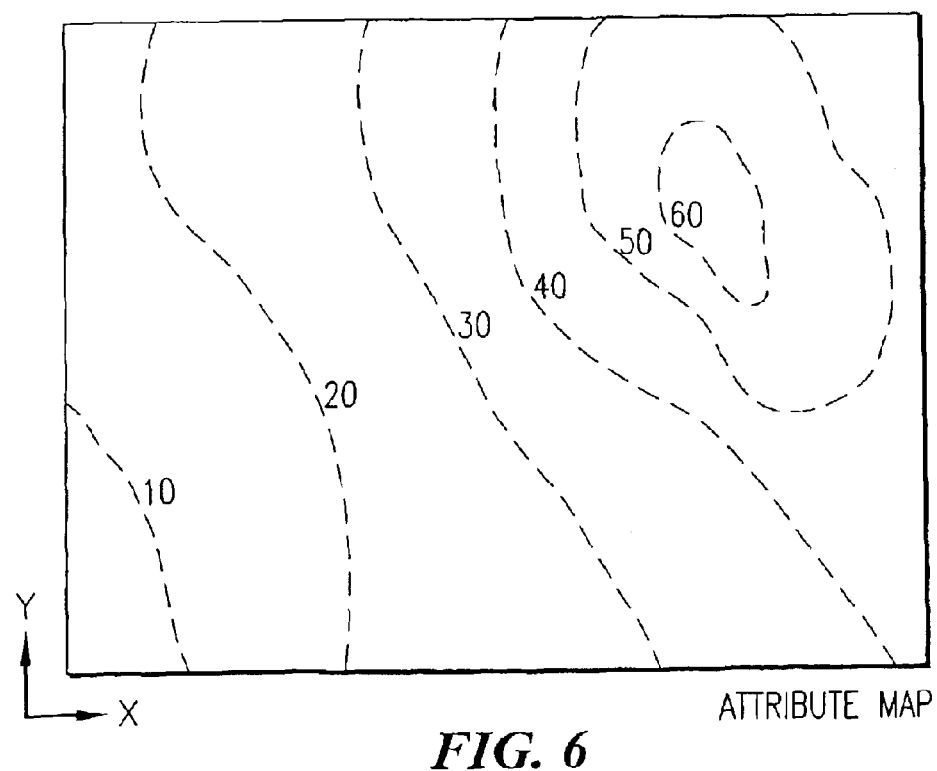
FIG. 6 is a simplified two-dimensional attribute map of the physical structure represented by the contour map in FIG. 5.
Figure 7:
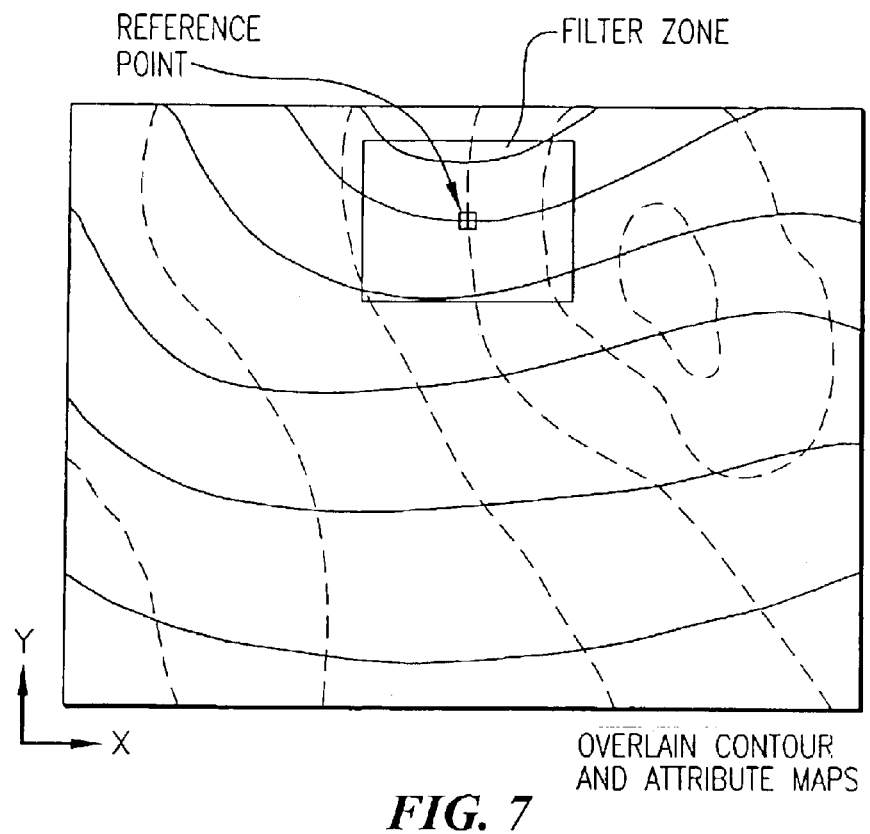
FIG. 7 shows the contour and attribute maps of FIGS. 5 and 6 overlain on one another, with a reference point being selected and a filter zone being defined around the reference point.

Referring to FIG. 5, a simplified two-dimensional contour map of a physical structure is provided to illustrate contour lines (labeled with contour values 100 through 600) of the physical structure. The contour map of FIG. 5 represents a view that is perpendicular to the X-Y plane, with the contour lines illustrating the position of the physical structure relative to the Z axis (defined by the range of contour values). Referring now to FIG. 6, a simplified two-dimensional attribute map of the same physical structure illustrated by the contour map in FIG. 5 is shown, with dashed lines (labeled with attribute values 10 through 60) showing the varying attribute values at locations coincident with the contour map illustrated in FIG. 5. When the attribute map (shown in FIG. 6) is a seismic map of a subsurface structure, the attribute values may be, for example, amplitude, internal velocity, AVO class, or instantaneous frequency. FIG. 7 illustrates the coincident attribute and contour maps from FIGS. 5 and 6 being overlain on one another.

Referring again to FIG. 1, in step 24, a reference point is selected from the attribute data points that define the attribute map. In step 26, a spatial filter zone around the reference point is defined. As shown in FIG. 7, the filter zone is generally an area defined relative to the X and Y axes. For example, if the referenced point is located at x=200 and y=500, the boundaries of the filter zone may be defined by x=200+/−20 and y=500+/−15. Although the filter zone illustrated in FIG. 7 has a generally rectangular shape, it should be understood that the filter zone can have any of a variety of shapes including a square or circular shape.

Figure 8:
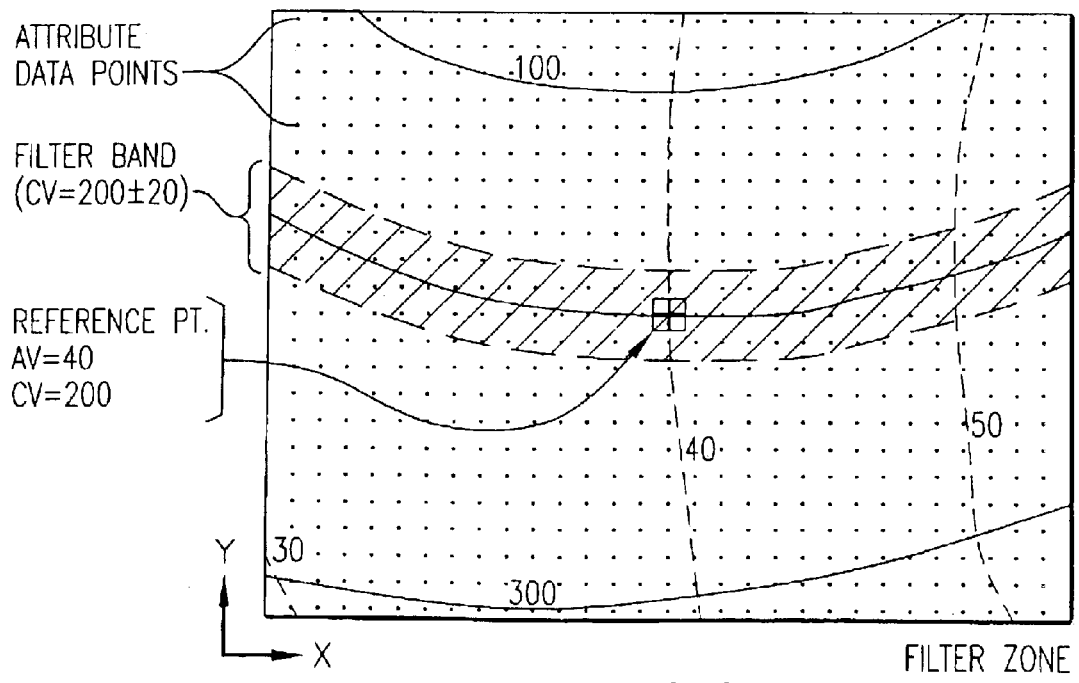
FIG. 8 is an enlarged view of the filter zone shown in FIG. 7, particularly illustrating that a filter band can be defined within the filter zone along a set range of contour values.

Referring again to FIG. 1, in step 28, a contour-based filter band is defined within the filter zone by setting a range of contour values around the contour value at the reference point location. FIG. 8 shows a filter band defined by the contour value at the reference point (i.e., contour value=200) plus and minus a contour value of 20. FIG. 8 also shows that a plurality of attribute data points land within the filter band. Preferably, at least 5 attribute data points land within the filter band. More preferably, at least 10 attribute data points land within the filter band. In step 30 (FIG. 1), a filtered attribute value is computed based on all the attribute values located within the filter band. Thus, only attribute data points having contour values falling within a certain range of the contour value of the reference points are used to compute the filtered attribute value to be associate with the reference point. The manner in which the filtered attribute value is computed can vary greatly. For example, the filtered attribute value can simply be an average of all the attribute values for attribute data points located within the filter band. However, the filtered attribute value can also be computed as a mode, median, or some other type of a statistical representation of the attribute values within the filter band.

Figure 4:
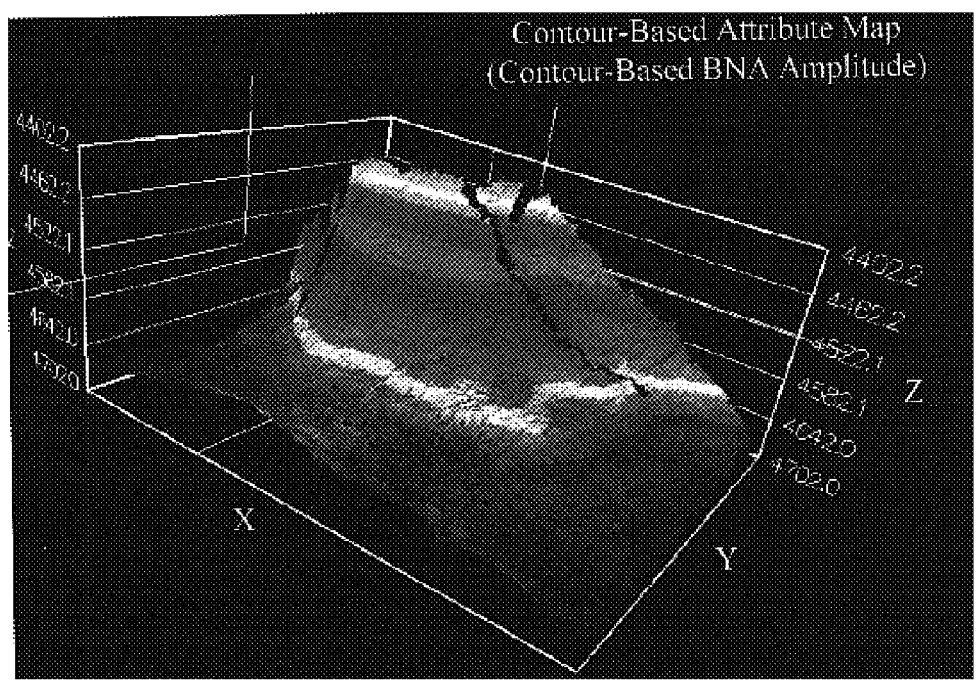
FIG. 4 is a computer generated contour-based attribute map generated using the system of the present invention, particularly illustrating contour-based BNA amplitude values that indicate upper and lower hydrocarbon boundaries.

In step 32 (FIG. 1), the filtered attribute value computed in step 30 can be written to a contour-based attribute map at a location corresponding to the location of the reference point. In step 34, the computer asks whether or not more attribute data points in the attribute map need to be filtered. If not all attribute data points in the attribute map have been filtered, the reference point is set to the next attribute data point in step 36. Steps 26 through 32 can then be performed using the next attribute data point as the reference point. Once all the attribute data points from the attribute map have been filtered and written to the corresponding contour-based attribute map, the contour-based attribute map can be viewed in step 38 using conventional seismic viewing tools. FIG. 4 shows an exemplary contour-based attribute map computed from the contour and attribute maps illustrated in FIGS. 2 and 3. The color bands of FIG. 4 represent ten millisecond contours and the bright red zones are coincident with areas of wavelet tuning associated with hydrocarbon fill. The upper and lower white bands represent the upper and lower hydrocarbon limits.

Figure 9A:
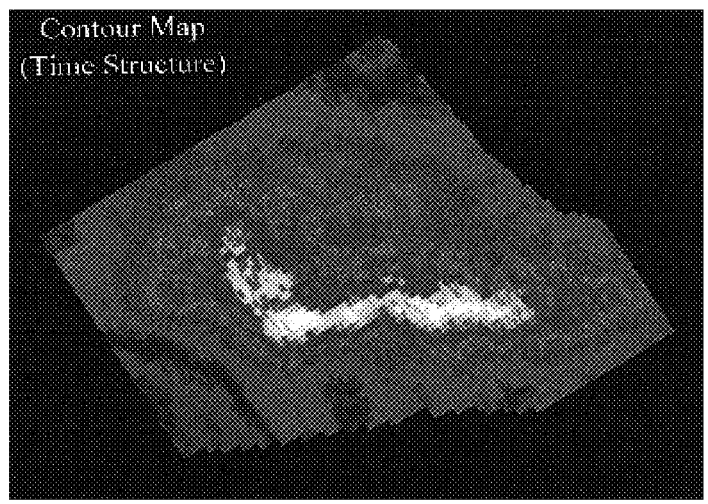
FIG. 9a is a computer generated time structure contour map.
Figure 9B:
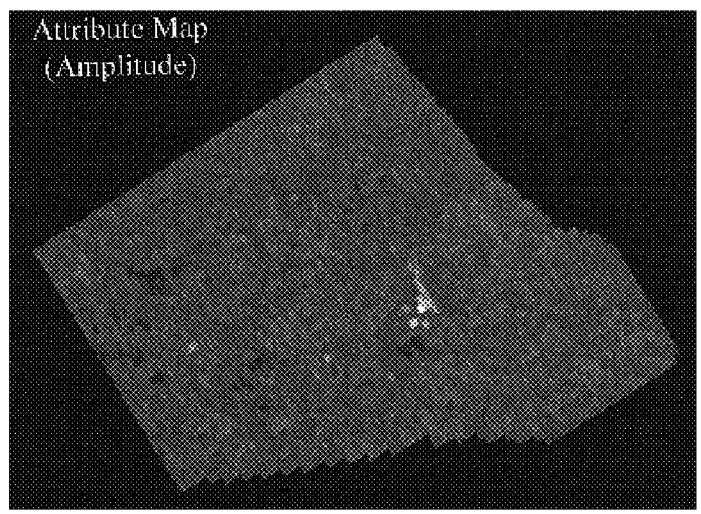
Figure 9C:
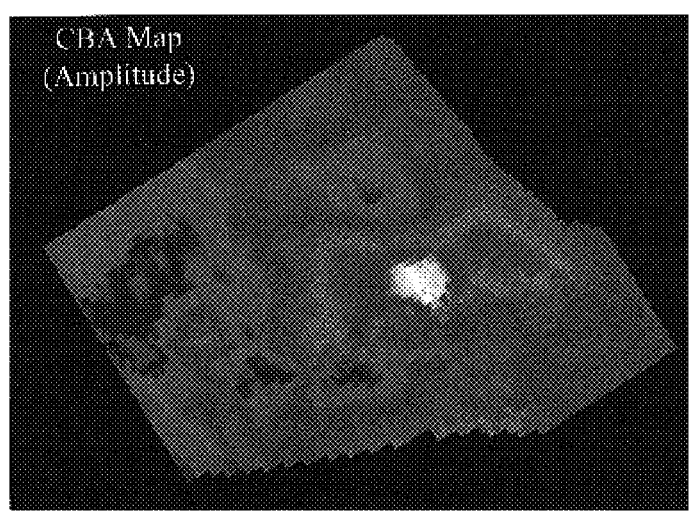
FIG. 9c is a computer generated contour-based amplitude map generated in accordance with the present invention.

Referring to FIGS. 9a–c, a contour-based attribute map (shown in FIG. 9c) can be generated from the contour map (shown in FIG. 9a) and the attribute maps (shown in FIG. 9b) using the inventive method outlined in FIG. 1. The resulting contour-based attribute map (shown in FIG. 9c) is a more accurate indicator of hydrocarbon rich locations than conventional filtered amplitude maps.

Figure 10A:
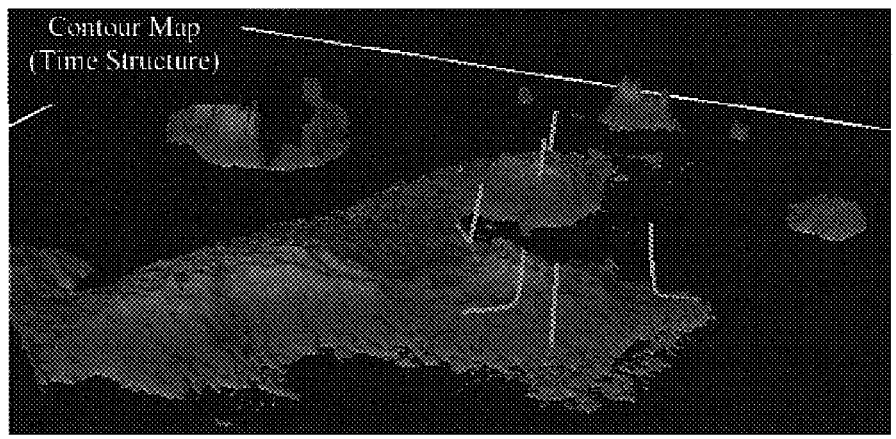
FIG. 10a is a computer generated time structure contour map.
Figure 10B:
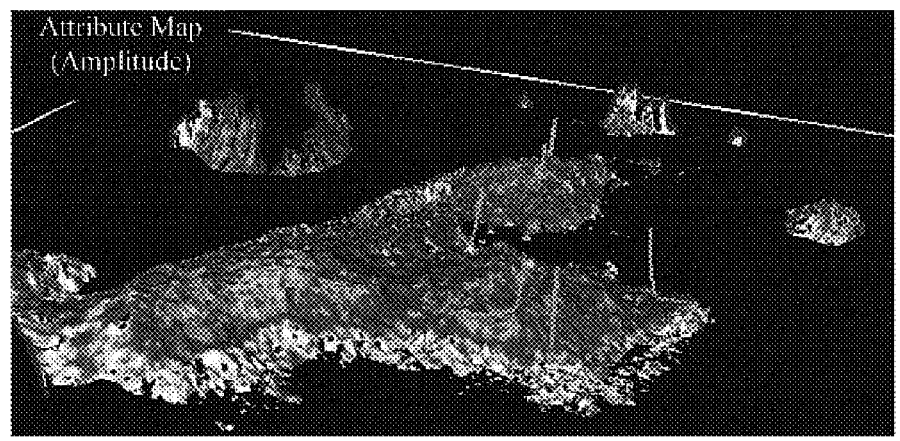
Figure 10C:
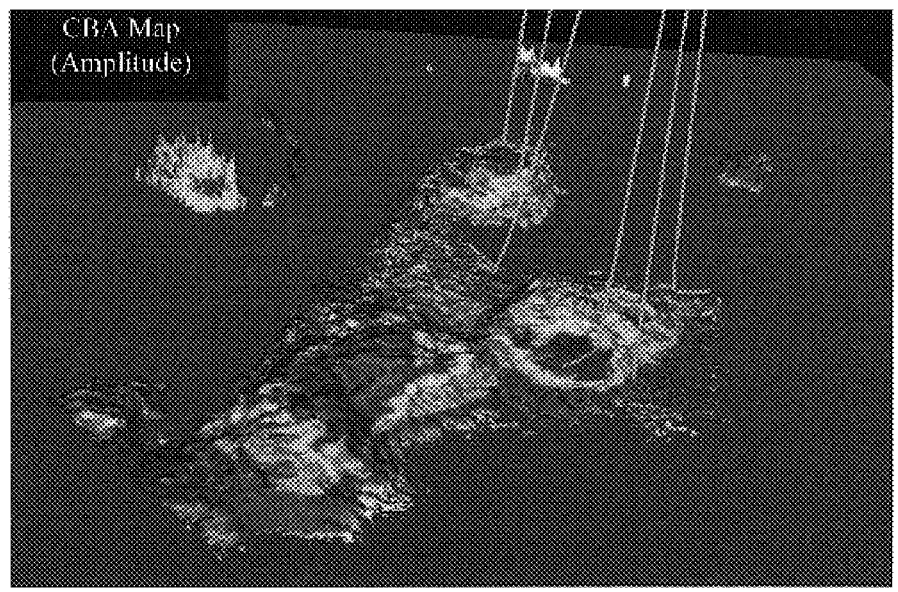
FIG. 10c is a computer generated contour-based amplitude map generated in accordance with the present invention.

Referring now to FIGS. 10a–c, a contour-based attribute map (shown in FIG. 10c) can be generated using the contour map (shown in FIG. 10a) and the attribute map (shown in FIG. 10b). FIG. 10b shows that the down dip amplitude is variable near the flat clipping plane (black) as the red-yellow boundary appears to move up and down along the field's edge. The contour-based attribute filtered amplitude in FIG. 10c shows a more consistent red color near the flat clipping plane. However, the amplitude cut-off is still not exactly coincident with the structure, which in this case, is consistent with a tilted water contact seen in area wells.

Figure 11A:
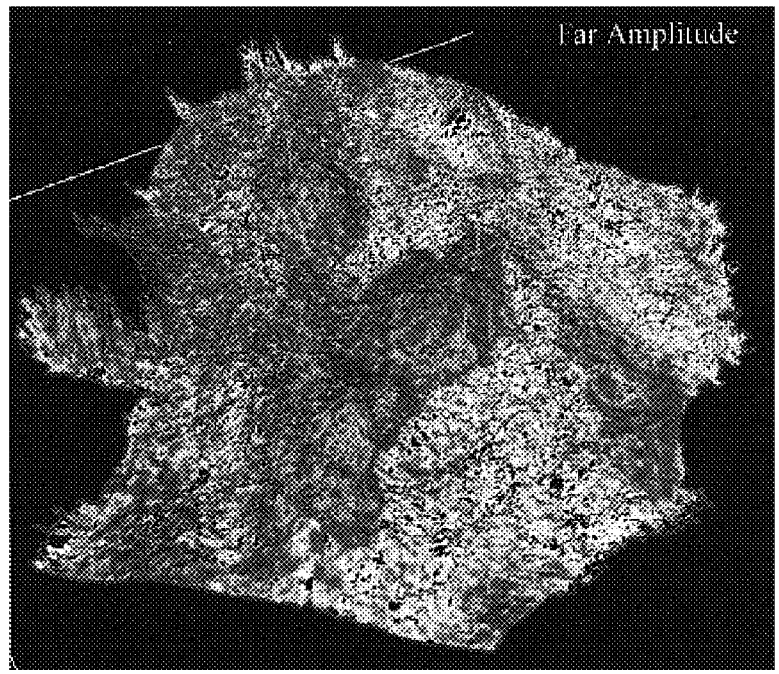
FIG. 11a is a computer generated map showing the far amplitude of a subterranean structure.
Figure 11B:
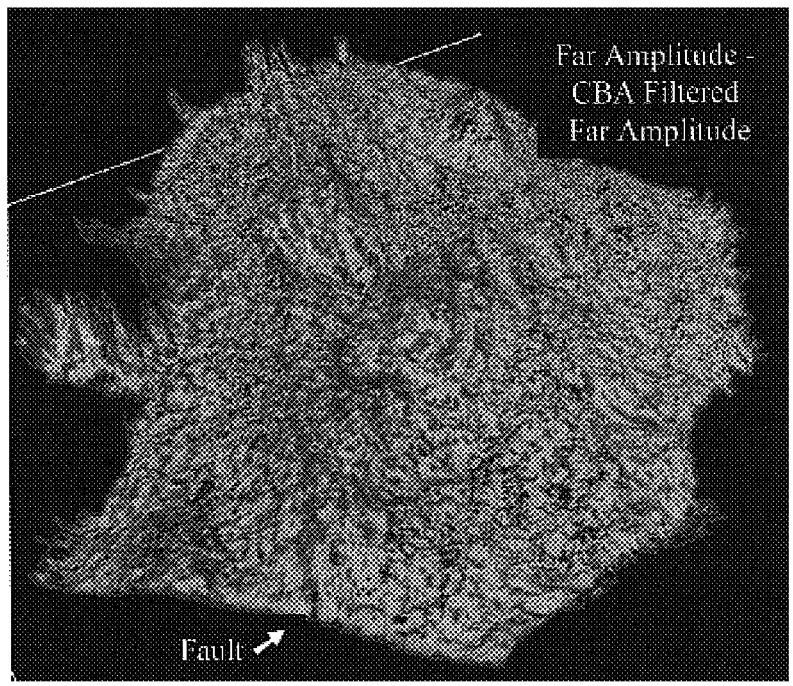
FIG. 11b is a computer generated map of far amplitude (shown in FIG. 11a) minus contour-based far amplitude, particularly illustrating the manner in which the differenced amplitude map enhances fault detection.

Referring now to FIGS. 11a and 11b, the contour-based attribute map can be subtracted from the unfiltered attribute map to aid in fault or edge detection.

FIG. 11a shows the unfiltered far amplitude map. FIG. 11b shows the map generated by differencing the contour-based attribute far offset amplitude map and the unfiltered far amplitude map. It can be seen that fault trends (shown in red on FIG. 1I b) are accentuated by differencing the contour-based map and the original attribute map.

The present invention finds application in a variety of areas of seismic data interpretation. In particular, the present invention can be especially helpful in identifying hydrocarbon contact locations, zones of diagenetic cementation, zones of anomalous pressure, and fault locations. Although the present invention has been described herein primarily with reference to the filtering of contour-sensitive seismic data, it should be understood that the invention may find application in a variety of areas where contour-sensitive data requires filtering.

The preferred forms of the invention described above are to be used as illustration only, and should not be used in a limiting sense to interpret the scope of the present invention. Obvious modifications to the exemplary embodiments, set forth above, could be readilymade by those skilled in the art without departing from the spirit of the present invention.

The inventors hereby state their intent to rely on the doctrine of equivalents to determine and assess the reasonably fair scope of the present invention as it pertains to any apparatus not materially departing from but outside the literal scope of the invention as set forth in the following claims.

What is claimed is:

1. A method of filtering contour-sensitive attribute data, said method comprising the steps of:
    (a) generating a contour map of a physical structure;
    (b) generating an attribute map of the physical structure, said attribute map being substantially coincident with the contour map;
    (c) defining a contour filter band that is limited to a certain range of contour values, said contour filter band having an upper boundary of substantially constant contour value and a lower boundary of substantially constant contour value; and
    (d) filtering the attribute map using only attribute values that are located within the contour filter band.

2. The method of claim 1,
    said attribute map being defined by a plurality of attribute data points,
    each of said attribute data points having a unique contour value based on the position of the attribute data point on the contour map,
    step (d) including filtering the attribute map using only attribute values of attribute data points having contour values within the range of contour values of the contour filter band.

3. The method of claim 2; and
    (e) prior to step (c), selecting one of the attribute data points as a reference point, step (c) including defining the contour filter band around the reference point.

4. The method of claim 3; and
    (f) prior to step (c), defining a filter area around the reference point.

5. The method of claim 4, step (c) including defining the contour filter band within the filter area.

6. The method of claim 5,
    step (d) including calculating an average attribute value for the attribute data points located within the contour filter band,
    step (d) further including assigning the average attribute value to the reference point.

7. The method of claim 1,
    said physical structure being a subterranean structure,
    said attribute map being a map of seismic data.

8. The method of claim 7,
    said contour map being selected from the group consisting of a depth map, a time map, an isochron map, and an isopach map.

9. The method of claim 8,
    said seismic data being selected from the group consisting of amplitude, interval velocity, AVO class, and instantaneous frequency.

10. A method of filtering contour-sensitive seismic data, said method comprising the steps of:
    (a) generating a contour map of a subterranean structure;
    (b) generating a seismic attribute map of the subterranean structure, said attribute map being defined by a plurality of attribute data points that are substantially coincident with the contour map;
    (c) selecting a reference point from the attribute data points;
    (d) defining a filter zone around the reference point;
    (e) defining a contour filter band within the filter zone, said contour filter band being limited to a certain range of contour values, said contour filter band having an upper boundary of substantially constant contour value and a lower boundary of substantially constant contour value; and
    (f) calculating a filtered attribute value for the reference point based on the values of all attribute data points located within the contour filter band.

11. The method of claim 10; and
    (e) writing the filtered attribute value to a contour-based attribute map at a location corresponding to the location of the reference point on the seismic attribute map.

12. The method of claim 11; and (f) subsequent to step (e), selecting a new reference point from the attribute data points; and (g) repeating steps (d)–(e) for the new reference point.

13. The method of claim 10, said contour map being selected from the group consisting of a depth map, a time map, an isochron map, and an isopach map.

14. The method of claim 13, said attribute map being selected from the group consisting of an amplitude map, an interval velocity map, a AVO class map, and an instantaneous frequency map.

15. The method of claim 10, said filtered attribute value being an average attribute value of all the attribute data points located within the contour filter band.

16. A computer-implemented method of filtering contour-sensitive seismic data, said method comprising the steps of:

(a) generating a topographical map of a subterranean structure, said map being defined by a plurality of seismic data points each having a unique position relative to orthogonal X, Y, and Z coordinate axes, said X and Y axis having units of distance, said Z axis having units of contour value;

(b) assigning a seismic attribute value to each seismic data point;

(c) selecting a reference point from the seismic data points;

(d) defining a filter zone around the reference point, said filter zone being defined along the X and Y axes;

(e) defining a contour filter band for the seismic data points located within the filter zone, said contour filter band being defined along the Z axis, said contour filter band having an upper boundary of substantially constant contour value and a lower boundary of substantially constant contour value; and (f) calculating a filtered attribute value for the reference point based on all seismic data points located within the contour filter band.

17. The method of claim 16, said contour value being selected from the group consisting of depth, time, isochron, and isopach.

18. The method of claim 17, said seismic attribute value being selected from the group consisting of amplitude, interval velocity, AVO class, and instantaneous frequency.

19. The method of claim 16, said contour value being time or depth, said seismic attribute value being amplitude.

20. The method of claim 16; and (g) generating a contour-based attribute map from the filtered attribute values for a plurality of reference points.

21. The method of claim 20; and (h) using said contour-based attribute map to identify hydrocarbon contact locations in the subterranean structure.

22. The method of claim 20; and (i) using said contour-based attribute map to identify zones of diagenetic cementation in the subterranean structure.

23. The method of claim 20; and (j) using the contour-based attribute map to identify zones of anomalous pressure in the subterranean structure.

24. The method of claim 20; and (k) using said contour-based attribute map to detect faults in the subterranean structure.

25. A program storage device readable by computer, said device tangibly embodying a program of instructions executable by the computer for filtering contour-sensitive seismic data, said program of instructions comprising the steps of:

(a) generating a contour map of a subterranean structure;

(b) generating a seismic attribute map of the subterranean structure, said attribute map being defined by a plurality of attribute data points that are substantially coincident with the contour map;

(c) selecting a reference point from the attribute data points;

(d) defining a filter zone around the reference point;

(e) defining a contour filter band within the filter zone, said contour filter band being limited to a certain range of contour values, said contour filter band having an upper boundary of substantially constant contour value and a lower boundary of substantially constant contour value; and (f) calculating a filtered attribute value for the reference point based on the values of all attribute data points located within the contour filter band.

26. An apparatus for filtering contour-sensitive seismic data, said apparatus comprising:

a computer programmed to carry out the following method steps:

(a) generating a contour map of a subterranean structure;

(b) generating a seismic attribute map of the subterranean structure, said attribute map being defined by a plurality of attribute data points that are substantially coincident with the contour map;

(c) selecting a reference point from the attribute data points;

(d) defining a filter zone around the reference point;

(e) defining a contour filter band within the filter zone, said contour filter band being limited to a certain range of contour values, said contour filter band having an upper boundary of substantially constant contour value and a lower boundary of substantially constant contour value; and (f) calculating a filtered attribute value for the reference point based on the values of all attribute data points located within the contour filter band.

27. A method of filtering contour-sensitive attribute data, said method comprising the steps of:

(a) generating a contour map of a physical structure, said contour map being defined relative to orthogonal X, Y, and Z coordinate axes, said X and Y axes having units of distance, said Z axis having units of contour value, said contour value being time or distance;

(b) generating an attribute map of the physical structure, said attribute map being substantially coincident with the contour map;

(c) defining a contour filter band along the Z coordinate axis, said contour filter band being defined between an upper boundary having a first substantially constant contour value and a lower boundary having a second substantially constant contour value; and (d) filtering the attribute map using only attribute values that are located within the contour filter band.

28. The method of claim 27, said attribute map being defined by a plurality of attribute data points, each of said attribute data points having a unique contour value based on the position of the attribute data point on the contour map, step (d) including filtering the attribute map using only attribute values of attribute data points having contour values between the first and second contour values of the upper and lower filter band boundaries.

29. The method of claim 28; and (e) prior to step (c), selecting one of the attribute data points as a reference point, step (c) including defining the contour filter band around the reference point.

30. The method of claim 29; and (f) prior to step (c), defining a filter area around the reference point, said filter area being defined along the X and/or Y coordinate axes.

31. The method of claim 30, step (c) including defining the contour filter band within the filter area.

32. The method of claim 31, step (d) including calculating an average attribute value for the attribute data points located within the contour filter band, step (d) further including assigning the average attribute value to the reference point.

33. The method of claim 27, said physical structure being a subterranean structure, said attribute map being a map of seismic data.

34. The method of claim 33, said seismic data being selected from the group consisting of amplitude, interval velocity, AVO class, and instantaneous frequency.

* * * * *